United States Patent Office 3,051,761
Patented Aug. 28, 1962

3,051,761
PROCESS FOR MAKING PENTACHLOROPHENOL
Gordon MacBeth and Robert G. Heitz, Concord, Calif., assignors to The Dow Chemical Company, Midland, Mich., a corporation of Delaware
No Drawing. Filed June 2, 1958, Ser. No. 738,936
2 Claims. (Cl. 260—623)

This invention relates to the production of pentachlorophenol by the alkaline hydrolysis of hexachlorobenzene.

The alkaline hydrolysis of hexachlorobenzene to produce pentachlorophenol is a well known process. A preferred mode of conducting the hydrolysis comprises heating hexachlorobenzene with an excess of aqueous caustic at a temperature of about 240° C. and a pressure of about 500–600 p.s.i., effective contact between the two phases being obtained by use of vigorous agitation and/or a surface-active dispersing agent. This yields an aqueous alkaline reactor effluent solution of alkali metal pentachlorophenate from which pentachlorophenol is commonly liberated by acidifying the cooled aqueous solution. A filtration step may precede the acidification. The product is thus obtained as a solid precipitate which may then be isolated by filtration, extraction by use of an organic solvent, or similar means. All of these methods for the isolation of the product from the reactor effluent have been unsatisfactory in that they are tedious and expensive or they yield an impure product or both.

Accordingly, it is an object of this invention to provide simple, economical and effective methods for isolating pentachlorophenol from the aqueous alkaline reactor effluent solutions in which it is obtained by the hydrolysis of hexachlorobenzene. Other objects will appear hereinafter.

According to the invention, pentachlorophenol is obtained in good purity, and in a physical form easily handled and used, by acidifying the aqueous alkaline reactor effluent liquor while the latter is at a temperature above the melting point of the product. In this way, the product is obtained as a molten organic layer that is easily separated from the accompanying aqueous brine without necessity of filtration, solvent extraction or other expensive process step. The molten pentachlorophenol thus obtained may be flaked on suitable rolls; solidified in mass; with or without subsequent grinding to the desired degree of fineness; sprayed into a stream of cool gas to solidify it in the form of discrete particles; dropped into a body of cool, non-solvent liquid; or otherwise reduced to the desired physical form.

Any unconverted hexachlorobenzene, being insoluble in aqueous caustic, is present in the reactor effluent as a separate phase which is liquid above about 225° and solid below that temperature. It may be separated from the caustic liquor by suitable mechanical means; e.g., by filtration at temperatures below about 225° or by decantation at higher temperatures.

In a preferred embodiment of the invention, the aqueous alkaline solution of pentachlorophenol formed in the reactor is maintained at a temperature between the melting point of pentachlorophenol (about 190° C.) and the reaction temperature at which it was formed (usually about 240° C.) and under a pressure at least sufficient to maintain it in the liquid state (usually about 250–600 p.s.i.) while any liquid or solid organic phase (unconverted hexachlorobenzene) is mechanically separated and the solution is acidified by the addition of a suitable acid, such as sulfuric, hydrochloric or the like. The liberated pentachlorophenol promptly separates as a clean-cut lower layer and can be mechanically separated from the aqueous brine layer. Suitably, it can be led directly to flaking rolls, spray towers or other means for cooling it to form a solid product having the desired physical form. Since pentachlorophenol is somewhat heat-sensitive under the conditions inherent in the process and darkens in color if held in the molten state for long periods, it is preferred that the temperature and time in the molten state be held to a practical minimum.

The practice of the invention is illustrated by the following example.

The aqueous alkaline solution of sodium pentachlorophenate from the conventional hydrolysis of hexachlorobenzene was received from the reactor at 240° C. and 575 p.s.i. This was partially flashed to reduce it to 208° C. and 250 p.s.i. and was then clarified by filtration. The calculated amount of concentrated hydrochloric acid to reduce the pH to about 4.9 was then added with adequate agitation. After acidification the agitation was stopped, whereupon a prompt, clean-cut separation into a lower oil-phase and an upper brine-phase occurred. The former was bled off and fed directly to a water-cooled flaking roll, after which the brine layer was flashed to produce process steam. The flaked product assayed 100 percent by titration, and chloride analysis showed only 0.04 percent as sodium chloride. The yield in this step was 92 percent of the theoretical. The residual brine, after flashing and cooling to room temperature, contained a precipitate which was filtered out and found to be pentachlorophenol (8 percent of theory). This could be used as such or recycled to the neutralizer for conversion to flaked form.

We claim:

1. In a process for making pentachlorophenol by the alkaline hydrolysis of hexachlorobenzene wherein there is formed an aqueous alkaline solution of pentachlorophenol at a temperature above about 190° C. and a pressure at least sufficient to maintain the materials in the liquid state, the steps comprising isolating the pentachlorophenol from the aqueous solution by acidifying said solution, thus to form a molten pentachlorophenol phase and an aqueous brine phase, and separating said phases.

2. A process as defined in claim 1 wherein the temperature is about 190 to 240° C. and the pressure is about 250 to 600 p.s.i.

References Cited in the file of this patent

UNITED STATES PATENTS

| 2,563,815 | Bruce | Aug. 14, 1951 |
| 2,755,307 | Nicolaisen | July 17, 1956 |